United States Patent [19]

Moore et al.

[11] Patent Number: 5,069,830
[45] Date of Patent: Dec. 3, 1991

[54] NON-WELDED SUPPORT PLATE OR BED LIMITER FOR PACKED TOWERS AND METHOD OF MAKING SAME

[75] Inventors: Frank D. Moore, Tallmadge; Michael J. Dolan, Brecksville, both of Ohio

[73] Assignee: Norton Company, Worcester, Mass.

[21] Appl. No.: 481,486

[22] Filed: Feb. 20, 1990

[51] Int. Cl.$^5$ ............................................. B01F 3/04
[52] U.S. Cl. ................................. 261/94; 52/665
[58] Field of Search ............... 261/94, 114.5; 52/665

[56] References Cited

U.S. PATENT DOCUMENTS

| | | | |
|---|---|---|---|
| 311,167 | 1/1885 | Adams | 52/665 |
| 756,861 | 4/1904 | Layton | 52/665 |
| 3,015,375 | 1/1962 | Lickliter et al. | 52/665 |
| 3,645,510 | 2/1972 | Klugman | 261/94 |
| 3,653,845 | 4/1972 | Moravec | 23/288 |
| 3,714,752 | 2/1973 | Ratliff, Jr. | 52/665 |
| 3,759,497 | 9/1973 | Black | 261/113 |
| 4,028,442 | 6/1977 | Eckert | 261/94 |
| 4,133,852 | 1/1979 | DiNicolantonio et al. | 261/114.5 |
| 4,151,694 | 5/1979 | Sriberg et al. | 52/665 |
| 4,171,333 | 10/1979 | Moore | 261/94 |
| 4,276,242 | 6/1981 | Chen et al. | 261/111 |
| 4,494,350 | 1/1985 | Sharp | 52/665 |
| 4,557,876 | 12/1985 | Nutter | 261/94 |
| 4,744,929 | 5/1988 | Robinson et al. | 261/97 |
| 4,814,117 | 3/1989 | Leva | 261/94 |
| 4,850,172 | 7/1989 | Gailey et al. | 52/665 |
| 4,865,819 | 9/1989 | Dowd et al. | 261/94 |

OTHER PUBLICATIONS

Stoneware bulletin HDP-56, "Hold-Down Plates", Akron 9, OH, 1958, 261-294, 4 pages.

Primary Examiner—Tim Miles
Attorney, Agent, or Firm—David Bennett

[57] ABSTRACT

A non-welded plate for supporting packing materials or limiting the upward movement of such packing materials in a packed column of a gas and liquid contacting apparatus is comprised of a plurality of first and second support beams. The first support beams have means for fastening to internal support members of the apparatus affixed thereon. The first and second support beams are essentially perpendicular to each other and are attached together by retaining means, such as a pin. Voids between the support beams may be covered with screen to provide further support or limitation.

24 Claims, 3 Drawing Sheets

NON-WELDED SUPPORT PLATE OR BED LIMITER FOR PACKED TOWERS AND METHOD OF MAKING SAME

This invention relates to a structure for a nonwelded support plate or bed limiter for a tower or other vessel which contains a bed of packing for improving mass transfer, particularly mass transfer between gases and liquids. Further, this invention relates to a method of manufacturing and installing said non-welded support plates or bed limiters for such application.

The use of packing materials in chemical processing apparatus is well known. Most commonly, such packing materials are used to provide a passage for upwardly flowing gases and provide a supporting surface for downwardly flowing liquid, thereby increasing the surface area available for contact between the gas and the liquid. In most applications where tower packing is used, a support plate is required. Packing in such towers is usually referred to as either "random", or "structured". By the term "random" packing, we mean packing that is placed into the tower without regard to orientation. The variety of such materials varies from ceramics to metallic to various polymeric materials, and the shapes vary from regular shapes such as spheres to quite irregular shapes. The variety of materials and structures for such random packings are well known in the art and obvious to one of ordinary skill. Because of the nature of the random packing often used, it is sometimes prudent to place a bed limiter plate above the packing to limit its upward movement.

By the term "structured" packing, we mean packing that is designed to be placed into the tower with a specific orientation. Such packing is typically stacked atop itself above a fixed support plate. As with random packing, it is sometimes prudent to use a bed limiter plate above the packing to limit or restrain its upward movement.

The purpose of a support plate in a chemical vessel is to structurally support the load of the packed section or packed bed, as it is commonly referred to, while still allowing the free passage of gas and liquid through the plate. Typically, liquid is introduced on the upper end of the vessel and flows downwardly as a thin film on the surfaces of the packing material. Also typically, gaseous vapors are injected into the lower end of the vessel, although they may be introduced into the upper end of the vessel, and are sent through the openings in the support plate and the packing material, moving through the vessel in intimate contact with the liquid film on the surfaces of the packing. When the gas and liquid are both introduced at the same end of the vessel, the contacting method is referred to as being "co-current"; when the gas and liquid are introduced at opposing ends, the contacting method is referred to as "counter-current." The packing materials and support structures described herein are commonly used in both modes of vessel operation.

The purpose of the intimate contact between the liquid and the gas is to achieve mass transfer, a chemical reaction, heat exchange and/or scrubbing of the gaseous stream. It is also a goal of the designer of a tower and its internals to achieve these purposes with a minimal amount of pressure loss or drop across the tower. It should be understood that while all references made in this specification are to counter-current flow of liquid and gas, the present invention is just as operative for co-current flow.

The support plate for the packed bed must be able to withstand its own dead weight and that of the packing material placed upon it, as well as the weight of the liquid adhering to and forming a thin film on the packing material and any pools of the liquid forming on the support plate. In addition, the support plate must withstand the upward forces from the gas stream. The support plate must be designed with a safety factor sufficient to allow the vessel to maintain structural integrity even during a period of liquid flooding, i.e., excess amounts of liquid in the vessel, and gas surges, i.e., an excess flow of gas upwardly in the tower that would tend to raise the support plate and the packing material out of position upwardly, thereby allowing the packing to drop out of position.

In addition, some applications of packed towers require that a second support structure be placed at the top of the packed bed section. This second support structure is commonly known as a bed limiter and is to maintain the tower packing in a fixed position and to prevent fluidization or entrainment of the packing upwardly from its normal position, which is commonly caused by upward gas surges. The same features that are disclosed as the inventive concept of the non-welded support plate disclosed herein are also found to be useful in design of such bed limiters. It should be appreciated that the same disclosure that puts one in possession of the knowledge necessary to design and construct the non-welded support plate of the present invention also enables the same person to design and construct the non-welded bed limiter plate of the present invention.

In the commercial applications generally encountered, the vessels in which support plates or bed limiters are used are typically several feet in diameter. However, the access to such a vessel is usually limited to a portal that does not exceed 18 to 24 inches in diameter. Therefore, it is not practical to fabricate a unitary support plate or bed limiter for placement in the tower from above or below. A direct consequence is that a support plate or bed limiter, in order to be useful in commerce, must be assembled in place in a very confined space.

Typical practice is to form the support plate or bed limiter in sections that are welded in the process of producing the support plate or bed limiter. This concept is disclosed and well described in several United States patents, including U.S. Pat. Nos. 4,171,333, 3,158,171 and 3,419,253.

Many of the chemical applications in which packed beds and vessels are used require the use of exotic metals or metal alloys that are difficult and costly to weld. Further, the introduction of welds, made either in producing the materials for the support plate or bed limiter or in assembling the support plate or bed limiter itself, into these metallurgies often results in questionable or poor corrosion resistance, and, eventually, in early failure of the support plate or bed limiter. Replacement of such a support plate or bed limiter, in addition to requiring the removal of the bed material, requires the shutting down of the chemical process, often resulting in large financial costs to the operator of the tower.

SUMMARY OF THE INVENTION

The principal objective of the present invention is to provide a support plate or bed limiter which is relatively uncomplicated, easily manufactured and structurally sound, but that can be produced either at a remote location or on site and assembled on site without requiring welding.

While achieving this objective, the invention also attempts to achieve the objective of reducing fabrication and assembly costs of the support plate or bed limiter.

A third objective of the invention is to form a support plate or bed limiter that is structurally sound and long-lasting.

The common practice for placing support plates or bed limiters in towers and vessels is to rest the support plate or bed limiter upon a circumferential support ledge made integral to the interior of the tower or vessel wall. In some larger towers, support beams that span the diameter of the tower are also used to reduce the structural span of the support plate. It is not an object of the present invention to provide structural support to the tower itself. The present invention is limited to a method of supporting a packed tower bed, in the case of a support plate, or a method of limiting packing mobility during upward surges of liquid or gas, in the case of a bed limiter. Although the description of the embodiments herein and the drawings disclose a specific design concept, the variations that one encounters in designing tower support plates or bed limiters are well known. For example, the variation of the load to be supported can be great. Packing material that is supported can vary from a low of about three pounds per cubic foot for plastic materials to as high as about 50 pounds per cubic foot or higher for ceramic materials. Additionally, height variations of the bed to be supported can vary from a low of two feet or so to about 40 feet or more. The diameter of the tower or vessel in which the support plate is to be placed can also vary greatly, from about two feet or less to more than 30 feet. The exact design requirements for a tower support plate are, however, well known and will be obvious to one of ordinary skill in the art.

In the case of a support plate, the foregoing and other objectives are achieved by a plate for supporting packing materials in a packed column of a gas and liquid contacting apparatus having permanent internal support members, said plate comprising a plurality of first and second support beams, a means for engaging said first support beams with said permanent internal support members without welding and means for fastening said first and second support beams rigidly without need for welding. Each such first support beam, also referred to as a minor beam, is essentially "U" shaped in cross-section with a support ledge portion folded outwardly at the open end of each arm of the "U" and has first and second ends and an intermediate portion therebetween.

Each such second support beam, also referred to as a cross brace, is essentially a flat piece of metal bent at least once along its length into an angle iron having a cross-section resembling an inverted "L" or an inverted "U" with a flattened bottom. Each such second support beam has first and second ends and an intermediate portion therebetween, the horizontal surface of the angle iron being further extended beyond the length of the vertical surface of the angle iron to form an end flap dimensioned, when positioned perpendicular to a first support beam, to rest atop the support ledge of the first support beam and extend into the channel between the arms of the "U" thereon.

A plurality of first support beams, being of varying lengths, are disposed essentially parallel to each other to engage the permanent internal support members and thereby span the cross sectional area of the contacting apparatus between such permanent internal support members. A plurality of second support beams, being of proper length to span the perpendicular distance between adjacent first support beams, are disposed essentially perpendicular to the plurality of first support beams and essentially parallel to each other, thereby dividing the cross-section of the contacting apparatus into a plurality of open areas.

The means for engaging the first support beams to the permanent internal support members comprises a pair of notches at each end of each first support beam, each said pair of notches being on the opposing arms of the "U" shaped cross-section and dimensioned to engage with a permanent internal support member.

The means for fastening first and second support beams comprises a fastening aperture on each end flap of each second support beam, a plurality of opposed pairs of fastening apertures disposed along the length of each first support beam, one of each pair of apertures being on each arm of the "U" shaped cross-section, the number of such opposed pairs of such fastening apertures varying to match the number of second support beams to be fastened to the first support beam, each fastening aperture on each first support beam positioned so as to be aligned with a fastening aperture on the end flap of the second support beam when such end flap is positioned into the channel of the first support beam, and a retaining means sized and adapted to pass sequentially through the first of an opposed pair of fastening apertures on a first support beam, at least one fastening aperture on the end flap of a second support beam and the second fastening aperture of the opposed pair.

In the case of a bed limiter, the foregoing and other objectives are achieved by a plate for limiting the upward movement of packing materials in a packed column of a gas and liquid contacting apparatus having permanent internal support members, said plate comprising the same elements as the support plate described above, but said bed limiter being placed atop the packing materials rather than below them.

Further objectives are achieved by a method of installing a plate for supporting packing materials or limiting the upward movement of packing materials in a packed column of a gas and liquid contacting apparatus having permanent internal support members, said method comprising 1) engaging a plurality of first support beams with said permanent internal support members, such that the first support beams span a plurality of essentially parallel chords across the tower; and 2) disposing a plurality of second support beams perpendicular to pairs of adjacent said first support beams and fastening each said second support beam to said first support beams without the need for welding. Even more specifically, the retaining means is a pin of sufficient length to be bent downwardly on the ends after passing through the apertures.

It should be noted that the addition of the screen is necessary when the packing elements are sufficiently small to pass through the openings between the first and second support beams.

ABSTRACT OF THE DRAWINGS

Figure 1:
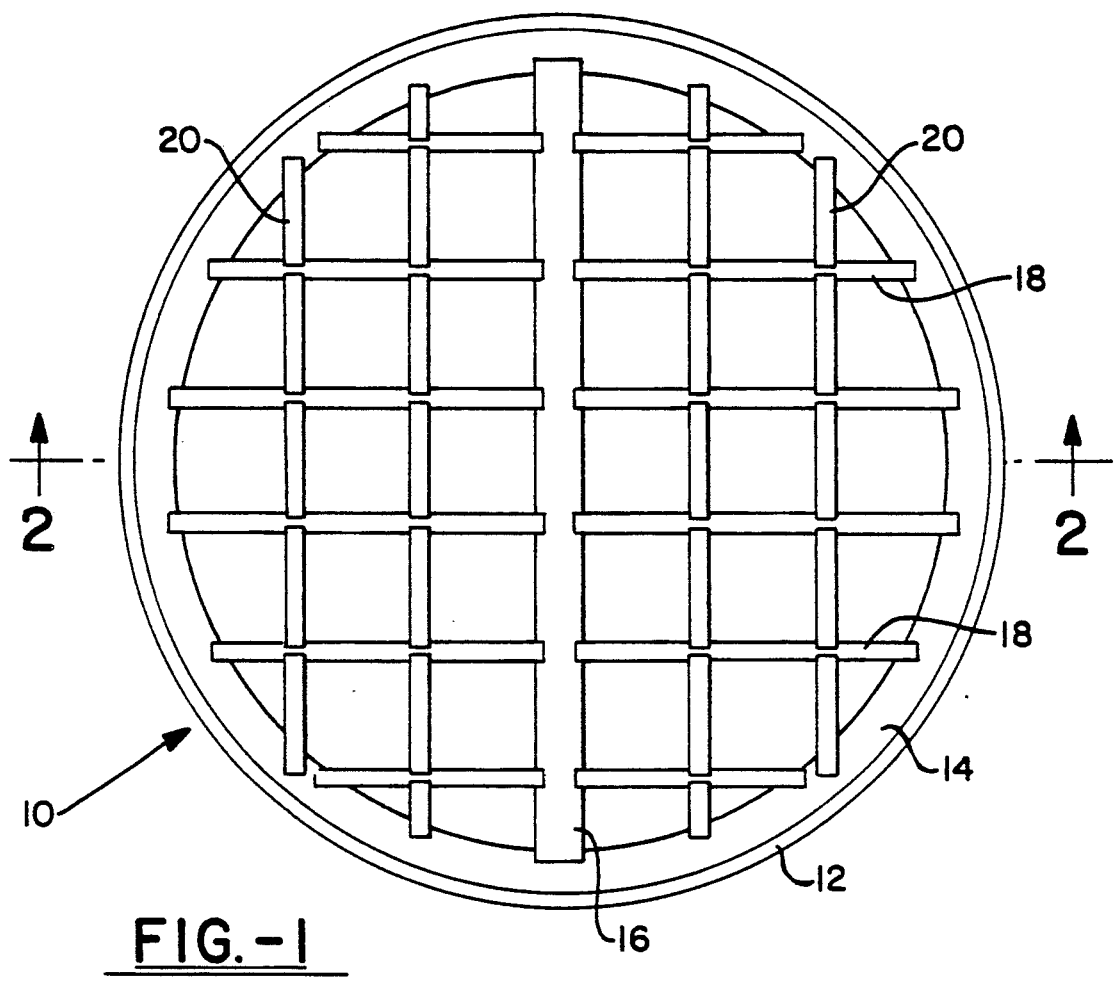
FIG. 1 is a plan view of the tower support plate of the present invention, without the support screen in place.

In the drawings attached hereto, the elements of the invention are denoted by the following numbers:

10 is the tower in which the invention is employed;
12 is the vertical wall of tower 10;
14 is the wall ledge of tower 10;
16 is a major beam of tower 10;
18 is the minor beam or first support beam of the invention;
20 is the cross brace or second support beam of the invention;
30 is the notch in minor beam 18;
32 is the support ledge of minor beam 18;
34 and 34' are fastening holes in minor beam 18;
36 is the lower surface of minor beam 18;
38 are weep holes in minor beam 18;
40 is the upper horizontal support surface of cross brace 20;
42 is the vertical member of cross brace 20;
44 is the flap plate of cross brace 20;
46 is the central aperture of flap plate 44;
50 is the fastening means of the invention;
60 is the support screen of the invention;
62 is the flat support surface of support screen 60;
64 are the opposing folded surfaces of support screen 60: and
66 are fastening holes in support screen 60

DESCRIPTION OF THE PREFERRED EMBODIMENTS

A plan view of the non-welded packing support plate of the present invention, without support screen, is shown in FIG. 1. The packing support plate is comprised of a plurality of minor beams 18 and cross braces 20 and support screen, which is not shown in FIG. 1. The packing support plate is shown installed in a typical tower 10, which is commonly used in the chemical processing industries. The tower 10 is typically cylindrical in structure, with a vertical tower wall member 12 and one or more wall ledges 14 formed integrally on the inside of the wall member 12 and substantially perpendicular to said wall member. In some large towers, there are also one or more major beams 16 that span the tower horizontally across the diameter thereof, providing additional support thereto. Although the description of the preferred embodiment presented herein assumes the presence of one such major beam 16, it is clearly obvious that the inventive concept disclosed herein is by no means limited to towers containing such major beams, and just as clearly obvious that the inventive concept disclosed herein is by no means limited to a tower containing only one such major beam.

The major structural features of the non-welded support plate of this invention are a plurality of minor beams 18 and a plurality of cross braces 20. The exact structural features of each type of support element is detailed further below, but the purpose of FIG. 1 is to disclose the manner in which the minor beams and cross braces are disposed with relation to the tower ledge 14 and a major beam 16 if one is present. The minor beams 18 are disposed horizontally across the tower in an orientation that is essentially perpendicular to the orientation of the major beam 16, if one is present, as shown in FIG. 1. If there were no major beam present, each of the minor beams 18 would span a chord across the tower from one wall ledge to the opposite wall ledge. The minor beams 18 are disposed substantially parallel to each other and preferably equidistantly spaced from each other. The exact spacing of the minor beams is easily determined by one of ordinary skill in the art. Spanning the tower in a direction substantially parallel to that of the major beam 16, if one is present, or, perpendicular to minor beams 18, if no major beam is present, are a plurality of cross beams 20. The length of each cross beam 20 is sized so as to span the distance between adjacent minor beams 18. The method of engagement of the minor beams, the cross beams, the major beam and the wall ledge is discussed further below.

Figure 2:
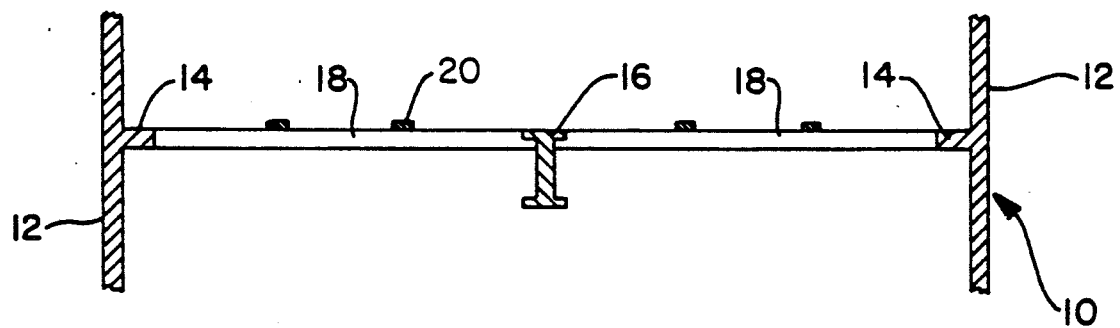
FIG. 2 is a view along line 2—2 in FIG. 1, showing the tower internals without the tower support plate of this invention installed.

Referring briefly, then, to FIG. 2, a crosssectional view of the tower 10 of FIG. 1 is shown, along the line 2—2 in FIG. 1, before installation of the packing support plate of the present invention. The major structural elements of the tower 10 are shown: the tower wall member 12, a wall ledge 14 and a major beam 16. These members are all of conventional design well known in the art, but are presented here to provide an understanding of the milieu in which the present invention is utilized. The wall ledge 14 is affixed integrally to the tower wall 12, most commonly by welding, but other means of affixation are well known and conventional. The major beam 16 is affixed to either the wall ledge 14 or the tower wall 12 in similar conventional manner. Although illustrated as an "I" beam, it is obvious that other known structures would be equally suitable, including, without intention to limit, a "T" beam.

Figure 3:
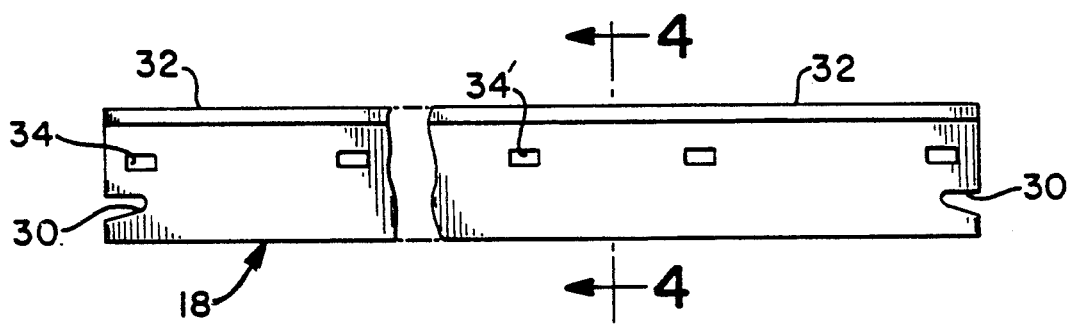
FIG. 3 is a side view of a minor support beam of the present invention.

Referring now to FIG. 3, the minor beam 18 of the present invention is disclosed in plan view. The minor beam 18, when viewed from the side as in FIG. 3, has several distinct features apparent. Each end of the beam 18 has a notch 30 cut into the beam 18. The notch 30 is typically located in the lower half of the beam height but the exact location is not critical to the invention. The height of the notch 30 is such that it is somewhat larger than the height of the horizontal wall ledge 14 or the horizontal portion of a major beam 16 that it is adapted to engage. In like manner, the depth of the notch 30 is adapted so that the minor beam 18 can be loosely engaged between respective wall ledges 14 or between the wall ledge 14 and a major beam 16, and a certain amount of play will be present until the structure of the support plate is tightened up by the placement of the support screens.

Each end of the minor beam 18 also has punched therein at least one fastening hole 34, which will be used for passing a fastening means therethrough to connect the minor beams with the cross braces 20 and the support screen as disclosed further below. Additional fastening holes 34' may be punched, preferably equidistantly and colinearly, along the length of the minor beam 18. Such additional fastening holes 34' are to accommodate engagement of an appropriate number of cross braces 20. The exact number of cross braces appropriate for the job of supporting the packing will be obvious to one skilled in this art. The fastening holes 34 and 34' are shown in FIG. 3 as having rectangular shape, although the shape of the holes is set only by that of the fastening means and is not critical to the invention.

A further feature disclosed in FIG. 3 is that the upper surface of the minor beam is folded outwardly or bent to form a support ledge 32 for the screen which will be attached. The lower surface 36 has no similar support structure.

Figure 4:
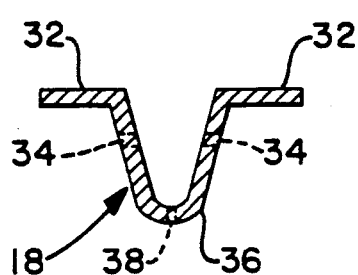
FIG. 4 is a cross-section view of the minor support beam of FIG. 3, taken at line 4—4.

Referring now to FIG. 4, which is a cross-sectional view of the minor beam 18 as described in FIG. 3 and shown along line 4—4 shown in FIG. 3, further features for the minor beam are disclosed. The minor beam 18 is formed from a rigid plate material, which can be pressed, drawn or otherwise formed into a "U" or "V" shape. An acceptable material for the minor beam 18 would strongly depend upon the application, but the appropriate metal or plastic for such an application would be readily determinable by one of skill in the art. When the minor beam 18 is formed, the top end at the upper surface is folded outwardly to form the support ledge 32 recited above. The notch 30 and the fastening hole 34 shown in FIG. 3 are present in each side of the cross-section of the minor beam 18. Additionally, a series of weep holes 38 may be drilled or punched in the lower surface 36 of the minor beam 18, to allow any liquid that pools in the "U" shaped bend of the minor beam 18 to pass through the beam and not add additional weight to the beam or cause holdup of liquid within the tower.

Figure 5A:
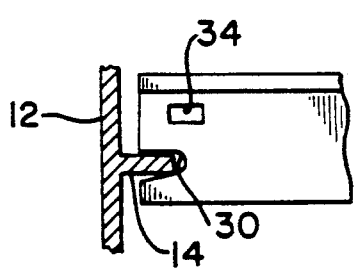
FIGS. 5A and 5B are side views, showing of the method of engaging the minor beams to the wall ledge and major beam, respectively.
Figure 5B:
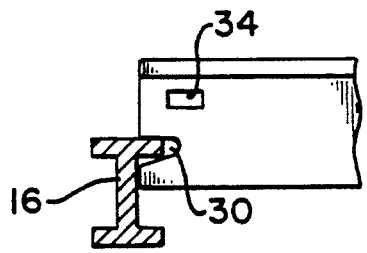

FIGS. 5A and 5B illustrate the engagement of the notch 30 of a typical minor beam 18 with a wall ledge 14 or a major beam 16.

Figure 6:
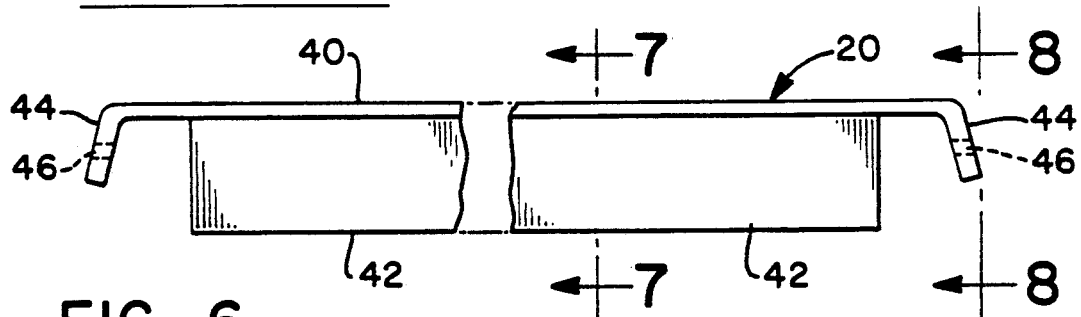
FIG. 6 is a side view of a cross brace of the present invention.
Figure 7:
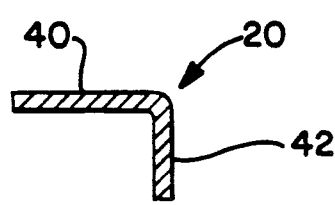
FIG. 7 is a cross-section view of the cross brace of FIG. 6, taken at line 7—7.
Figure 8:
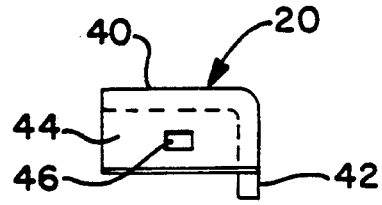
FIG. 8 is an cross-section view of the cross brace, taken at line 8—8 on FIG. 6.

Referring now to FIGS. 6 through 8, the various aspects of the cross brace 20 are disclosed. As shown best in FIG. 7, the cross brace 20 is an metal bar having at least one angular bend along its length, such that it has a horizontal surface and at least one essentially vertical surface. The cross brace 20 preferably has a vertical cross-sectional shape resembling an inverted "L" or an inverted "U" with the bottom of the "U" flattened. It should be understood that, while a "T"-shaped cross-section would also be appropriate, it will be appreciated that most such "T"-shaped metal structures commercially available are manufactured by welding two flat plates. It is clearly an objective of the invention to use no welds in preparing the support plate, either in manufacturing or in assembling. The upper horizontal surface 40 of the cross brace 20 provides a support surface for the screen to be placed thereon and the vertical member 42 is sized to provide lengthwise structural integrity. As best shown in FIG. 6, the horizontal support surface 40 extends beyond the length of the vertical member 42 and is bent downwardly at each end thereof into a flap plate 44, as best shown in FIG. 9.

Figure 9:
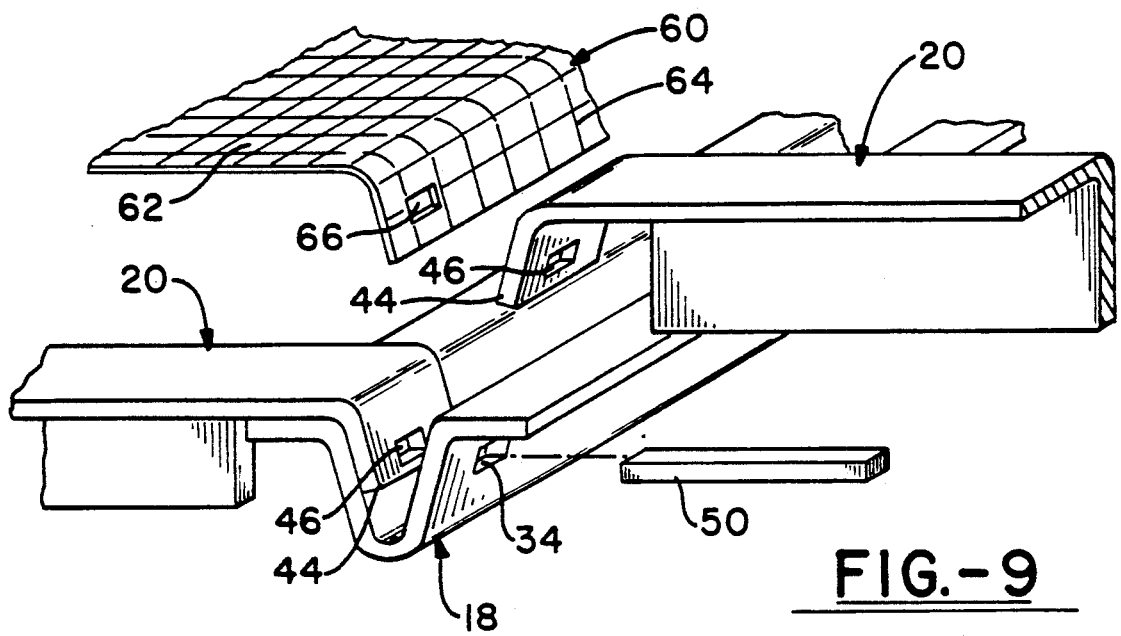
FIG. 9 is a perspective view of the method of engaging a minor beam with a cross brace and support screen.

As further shown in FIG. 9, each flap plate 44 has a central aperture 46 disposed therein adapted to fit a fastening means during assembly of the support plate.

The material of construction of the cross braces 20 can be determined by the exact requirement of the service in the tower, and such determination may be made by one of ordinary skill in the art. It is most probable, however, that the cross braces 20 and minor beams 18 will be of the same material.

Figure 10:
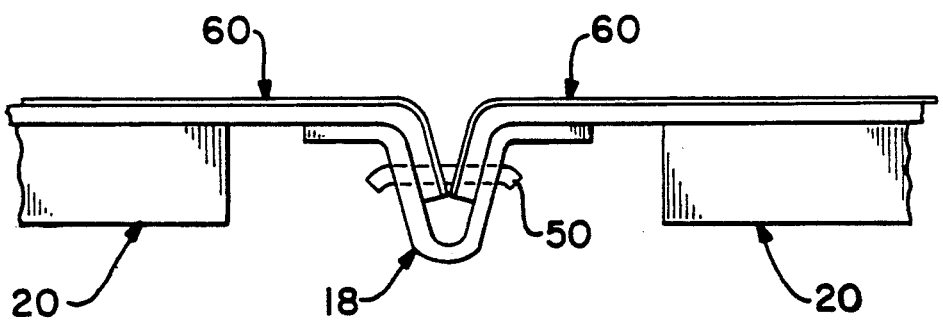
FIG. 10 is a cross-section view of a minor support beam of the present invention, showing the method of engaging the minor beam with cross braces and support screen.

Referring now to FIGS. 9 and 10, the method of operatively engaging the elements of the present invention is disclosed. After minor beams 18 are engaged with the wall ledge 14, the major beam 16, or a combination thereof, a pair of cross beams 20 are fitted loosely into place by placing the end flaps 44 into the open area of the "U" bend of the minor beam 18 such that an end flap 44 of each cross beam rests atop the support ledge 32 of the minor beam 18 and central aperture 46 of each cross beam is proximate to a pair of opposing fastening holes 34. Thus positioned, the minor beam and cross braces are secured together by a fastening means, particularly shown here as a pin 50 of rectangular cross-section, through the first fastening hole 34, the first central aperture 46, the second central aperture 46 and the second fastening hole, in that order.

The material of construction of the fastening means 50 will be obvious to one of ordinary skill, but it is clearly preferable, because of the proximity of the elements during use, that the fastening means be compatible with the materials used for the minor beams, cross braces and support screens, especially to minimize galvanic corrosion, which is certainly one of the problems that can be associated with welding.

This process is repeated until all of the cross braces and minor beams are secured in place. In cases where the voids are sufficiently large to pass the packing materials, a plurality of support screens 60 are then prepared for covering the void spaces left between the beams and braces. The support screens 60 are sized to be large enough in width and depth to not only fill the void spaces and provide some overlap, not only with each adjacent screen, but also into the "U" shaped channel in the minor beams 18 at the edges of the void space. The opposing edges that will be fitted into the "U" shaped channel are folded downwardly so that the support screen, once so folded, consists essentially of a flat support suface 62 and a pair of opposing folded surfaces 64. A plurality of fastening holes 66 may be punched into each folded surface 64, or holes inherent to the material of the support screen 60 may be used as fastening holes, but, in any case, a plurality of fastening holes 66 are provided along each folded surface 64. These fastening holes 66 are spaced so as to register upon the central apertures 46 of the cross beams 20.

The material of construction for support screen 60 will be preferably metallic and, more particularly, the preferred material will be the same material used for minor beams 18 and cross beams 20. Although referred to as "screen", it will be obvious that some metallurgies are more readily available, less costly, or easier to manipulate in an "expanded metal" form than in a "wire mesh" form, and that either may be used. In any case, the critical feature is that the support screen 60 must support the weight of the packed bed without inordinately decreasing the area available for the flow of gas and liquid along the tower's length. A preferred support screen material will have an open area in the range of about 60 to about 80%.

As each support screen 60 is positioned atop the respective cross braces 18 and minor beams 20 of the structure, the screen will rest on the cross brace's upper horizontal surface 40. The retaining means 50 is removed, the fastening hole 66 of the screen placed proximate to the respective central aperture 46, and the retaining means 50 is reinserted, with the fastening hole 66 being passed therethrough after the first central aperture 46 and before the second central aperture 46. Once all screens 60 are in place and properly fitted, the ends of the retaining means 50 are bent downwardly to lock the structure into place.

A bed limiter of the present invention will be designed and constructed in a manner exactly as disclosed in the preceding description of the support plate of the present invention. Of course, since the bed limiter need not support the weight of the entire bed of packing materials during normal operation and need be designed only to prevent upward movement of the bed packing materials during upward flow surges of a reasonably expected magnitude, the design criteria, particularly as related to weight bearing capacity, will differ somewhat. Of course, the person of skill in this art is familiar with such differences between support plates and bed limiters and will make such adjustments.

While in accordance with the patent statutes the preferred and best embodiment of the invention are disclosed herein, it is obvious that other embodiments and modifications thereof are possible that fall within the teachings of the invention. The scope of the invention is not to be limited to the above description, but is instead to be measured by the appended claims.

What is claimed is:

1. A plate for a gas and liquid contacting apparatus having permanent internal support members and a bed of packing materials, said plate intended for restraining said bed of packing materials and comprising:
    a plurality of first and second support beams;
    means for engaging said first support beams with said permanent internal support members without welding; and
    means for fastening said first and second support beams rigidly without welding;
    each said first support beam being essentially "U" shaped in cross-section with a support ledge portion folded outwardly at the open end of each arm of the "U" and having first and second ends and an intermediate portion therebetween;
    each said second support beam being essentially a flat bar having at least one angular bend along the length thereof to form a horizontal surface and at least one vertical surface, and having first and second ends and an intermediate portion therebetween, the horizontal surface of said second support beam being further extended beyond the length of the vertical surface to form an end flap dimensioned, when positioned perpendicular to a first support beam, to rest atop the support ledge of the first support beam and extend into the channel between the arms of the "U" thereon;
    said plurality of first support beams being of varying lengths and disposed essentially parallel to each other to engage the permanent internal support members and thereby span the cross sectional area of the contacting apparatus between such permanent internal support members;
    said plurality of second support beams being of proper length to span the perpendicular distance between adjacent first support beams and being disposed essentially perpendicular to the plurality of first support beams and essentially parallel to each other, thereby dividing the cross-section of the contacting apparatus into a plurality of open areas.

2. The plate for restraining packing materials of claim 1 wherein the plate is a support plate positioned under the packing materials to be retained.

3. The plate for restraining packing materials of claim 1 wherein the plate is a bed limiter positioned above the packing materials to limit upward movement of said packing materials.

4. The plate for restraining packing materials of claim 1 wherein the engaging means comprises a pair of notches at each end of each first support beam, each said pair of notches being on the opposing arms of the "U" shaped cross-section and dimensioned to engage with a permanent internal support member.

5. The plate for restraining packing materials of claim 4 wherein the fastening means comprises:
    a fastening aperture on each end flap of each second support beam;
    a plurality of opposed pairs of fastening apertures disposed along the length of each first support beam, one of each pair of apertures being on each arm of the "U" shaped cross-section, the number of such opposed pairs of such fastening apertures varying to match the number of second support beams to be fastened to the first support beam, each fastening aperture on each first support beam positioned so as to be aligned with a fastening aperture on the end flap of the second support beam when such end flap is positioned into the channel of the first support beam; and
    a retaining means sized and adapted to pass sequentially through the first of an opposed pair of fastening apertures on a first support beam, at least one fastening aperture on the end flap of a second support beam and the second fastening aperture of the opposed pair.

6. The plate for restraining packing materials of claim 5 wherein the retaining means is a pin of sufficient length to be bent downwardly on the ends after passing through the apertures.

7. The plate for restraining packing materials of claim 5 wherein the first support beams have further a plurality of weep holes disposed through the bottom of the "U" shaped portion to prevent liquid buildup therein.

8. The plate for restraining packing materials of claim 5 wherein all structural elements are metallic.

9. The plate for restraining packing materials of claim 8 wherein all metallic elements are comprised of the same material.

10. The plate for restraining packing materials of claim 5 comprising further a plurality of support screens, each such support screen being sized and adapted to cover at least one of the open areas into which the cross-sectional area of the contacting apparatus has been divided by the first and second support beams, each said support screen further being adapted to rest atop the support surfaces of the first and second support beams and fold downwardly into the "U" shaped channel of the first support beams, each said support screen having a plurality of apertures disposed therein for alignment with the fastening apertures of the second support beams upon which it rests and fastening thereto by retaining means.

11. The plate for restraining packing materials of claim 10 wherein the support screens have an open area in the range of about 60 to about 80%.

12. The plate for restraining packing materials of claim 11 wherein the support screen comprises wire mesh.

13. The plate for restraining packing materials of claim 11 wherein the support screen comprises expanded metal.

14. The plate for restraining packing materials of claim 10 wherein the retaining means is a pin of sufficient length to be bent downwardly on the ends after passing through the apertures.

15. The plate for restraining packing materials of claim 10 wherein the first support beams further have a plurality of weep holes disposed through the bottom of the "U" shaped portion to prevent liquid buildup therein.

16. The plate for restraining packing materials of claim 10 wherein all structural elements are metallic.

17. The method of installing a plate in a gas and liquid contacting apparatus having permanent internal support members and a bed of packing materials, said plate intended for restraining said packing materials, said method comprising:
  engaging a plurality of first support beams with said permanent internal support members, such that the first support beams span a plurality of essentially parallel chords across the tower; and
  disposing a plurality of second support beams perpendicular to pairs of adjacent said first support beams and fastening each said second support beam to said first support beams by retaining means comprising a pin passing through cooperating opposed apertures in said first and second support beams.

18. The method for installing a plate according to claim 17 wherein the retaining means is a pin of sufficient length to be bent downwardly on the ends after passing through the apertures.

19. The method of claim 17 wherein the plate is positioned in said contacting apparatus beneath the packing materials to provide support to said packing materials as a support plate.

20. The method of claim 17 wherein the plate is positioned in said contacting apparatus above the packing materials to limit upward movement of said packing materials.

21. The method of installing a plate in a gas and liquid contacting apparatus having permanent internal support members and a bed of packing materials, said plate intended for restraining said packing materials, said method comprising:
  engaging a plurality of first support beams with said permanent internal support members, such that the first support beams span a plurality of essentially parallel chords across the tower;
  disposing a plurality of second support beams perpendicular to pairs of adjacent said first support beams, thereby dividing the cross-sectional area of the contacting apparatus into a plurality of open areas, and temporarily fastening each said second support beams to said first support beams with retaining means;
  disposing a plurality of support screens, sized and adapted to cover at least one such open area, atop the first and second support beams, unfastening the retaining means fastening said first and second support beams, and fastening said first and second support beams and support screen by retaining means without the need for welding.

22. The method for installing a plate according to claim 21 wherein the retaining means is a pin of sufficient length to be bent downwardly on the ends after passing through the apertures.

23. The method of claim 21 wherein the plate is positioned in said contacting apparatus beneath the packing materials to provide support to said packing materials as a support plate.

24. The method of claim 21 wherein the plate is positioned in said contacting apparatus above the packing materials to limit upward movement of said packing materials.

* * * * *